United States Patent
Bunner

(10) Patent No.: US 10,517,284 B1
(45) Date of Patent: Dec. 31, 2019

(54) EZ FISHHOOK

(71) Applicant: Hency Anthony Bunner, Louisville, KY (US)

(72) Inventor: Hency Anthony Bunner, Louisville, KY (US)

( * ) Notice: Subject to any disclaimer, the term of this patent is extended or adjusted under 35 U.S.C. 154(b) by 0 days.

(21) Appl. No.: 16/576,839

(22) Filed: Sep. 20, 2019

Related U.S. Application Data

(63) Continuation of application No. 16/501,268, filed on Mar. 14, 2019, which is a continuation-in-part of application No. 15/330,995, filed on May 25, 2018, now abandoned.

(51) Int. Cl.
*A01K 91/04* (2006.01)
*A01K 83/00* (2006.01)

(52) U.S. Cl.
CPC .............. *A01K 91/04* (2013.01); *A01K 83/00* (2013.01)

(58) Field of Classification Search
CPC ................................ A01K 91/04; A01K 83/00
See application file for complete search history.

(56) References Cited

U.S. PATENT DOCUMENTS

| | | | | |
|---|---|---|---|---|
| 2,315,307 A * | 3/1943 | Wilson | ............... | A01K 83/00 43/44.83 |
| 3,878,637 A * | 4/1975 | Flower | ............... | A01K 83/00 43/44.83 |
| 4,092,796 A * | 6/1978 | Adams | ............... | A01K 83/00 43/44.83 |
| 5,081,785 A * | 1/1992 | Kahng | ............... | A01K 91/03 24/128 |
| 5,689,911 A * | 11/1997 | Lin | ............... | A01K 83/00 43/43.16 |
| 5,901,493 A * | 5/1999 | Tolliver | ............... | A01K 83/00 43/43.16 |
| 6,021,595 A * | 2/2000 | Noel | ............... | A01K 85/01 362/34 |
| 6,760,997 B1 * | 7/2004 | Mammel | ............... | A01K 83/00 43/43.16 |
| 2004/0181994 A1 * | 9/2004 | Morrow | ............... | A01K 83/00 43/42.36 |
| 2013/0014427 A1 * | 1/2013 | Rothan | ............... | A01K 83/00 43/43.1 |
| 2014/0090289 A1 * | 4/2014 | Bechtold | ............... | A01K 83/00 43/42.49 |
| 2015/0327525 A1 * | 11/2015 | Noack, Jr. | ............... | A01K 83/00 43/43.16 |
| 2017/0071175 A1 * | 3/2017 | Mathieu | ............... | A01K 83/00 |
| 2017/0339936 A1 * | 11/2017 | Simmons | ............... | A01K 91/04 |

* cited by examiner

*Primary Examiner* — Christopher R Harmon

(57) ABSTRACT

EZ Fishhook is a faster and easier way to insert and hold the fishing line within the eyelet hole. The eyelet channel opening from the shaft into the eyelet hole compresses the fishing line while passing through eyelet channel. Once the fishing line is inside the eyelet hole, the fishing line diameter decompresses to the same size of the eyelet hole diameter; thus, the fishing line is held tight within the eyelet. The fishing line, with the fishing line knot, is pulled I through the eyelet hole until the fishing knot is tight against the eyelet. The fishing line knot is held outside the eyelet due to the fishing knot being larger than the eyelet hole. The tight fit between the fishing line diameter and the eyelet hole diameter holds the fishing line knot tight against the eyelet while fishing.

1 Claim, 2 Drawing Sheets

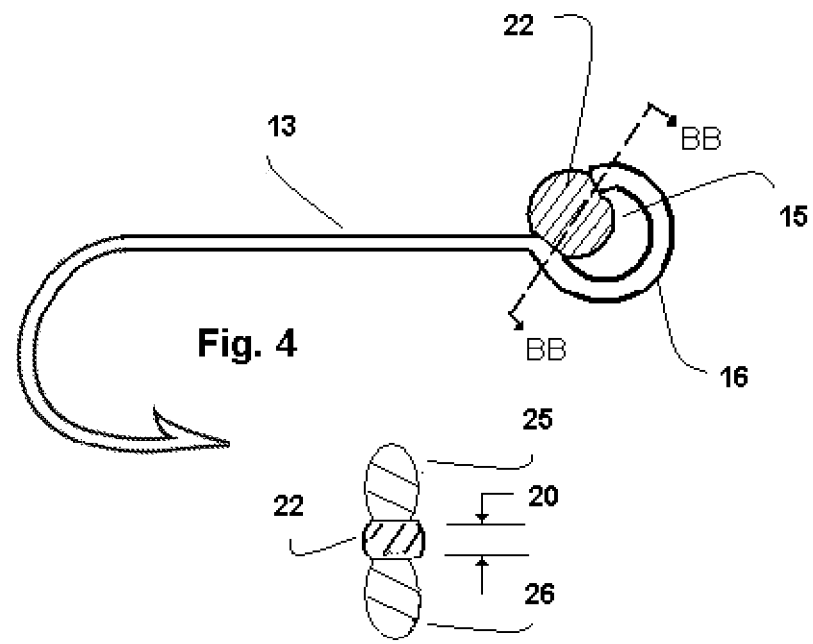
Fig. 4
Fig 4 BB
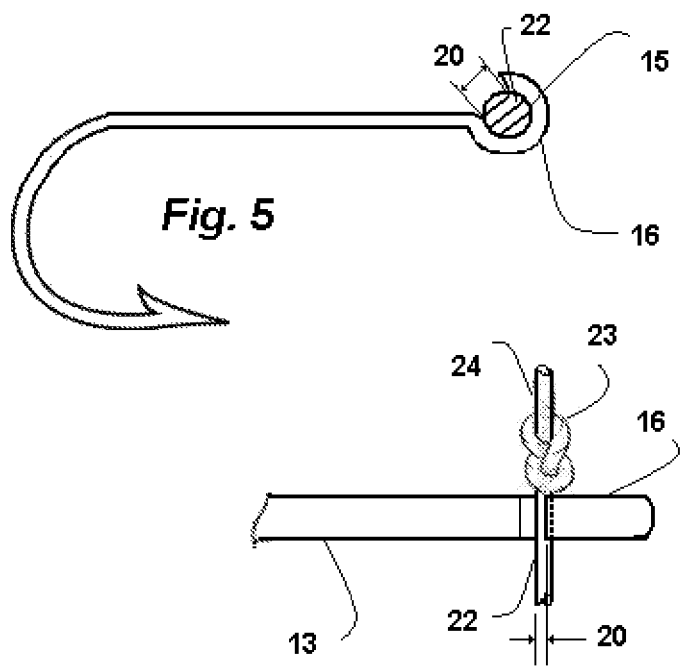
Fig. 5
Fig. 5A

EZ FISHHOOK

BACKGROUND OF THE INVENTION

Fishermen have been confronted with threading the eyelet of a fishing hook or tying a fishing line knot due to poor eyesight, shaky hands, lack of light, poor weather conditions and/or boat movement caused by rough waters. In fishing tournaments, it took valuable time to thread the fishing hook or tying a knot; thus, less time to catch fish. There was a need for a faster and easier way of threading the fishing hook and attaching the fishing line to the fishing hook.

BRIEF SUMMARY OF THE INVENTION

The EZ Fishhook eliminates the need to thread and capture the fishing line within the eyelet hole by drawing the fishing line through the eyelet channel into the eyelet hole while compresses the fishing line without damaging the strength and/or elastic properties of the fishing line. Once the fishing line enters the eyelet hole of the fishing hook, the fishing line decompresses to a diameter equal to the diameter of the eyelet hole, creating the interference fit between the fishing line and exit opening to the eyelet hole, holding the fishing line within eyelet hole. The fishing line knot is tied prior to threading the hook. After the fishing line is secured within the eyelet hole, the fishing line is drawn through the eyelet hole until the fishing knot reaches the eyelet hole. The fishing line knot is larger than the eyelet hole: thus, the fishing knot cannot be pulled through the eyelet. The tight fit between the fishing line diameter and the eyelet hole diameter holds the fishing line knot in place against the eyelet during fishing.

BRIEF DESCRIPTION OF THE SEVERAL VIEWS OF THE DRAWING(S)

FIG. 4 is a perspective side view of the cross section of the fishing line being compressed within an embodiment of the disclosure.

FIG. 4BB is a perspective side view of the cross section of the compressed fishing line and a cross section an embodiment of the disclosure of FIG. 4.

FIG. 5 is a perspective side view of the cross section of fishing line inside the eyelet hole of an embodiment of the disclosure.

FIG. 5A is a perspective top view of the fishing line and fishing knot being held outside of an embodiment of the disclosure of FIG. 5.

DETAILED DESCRIPTION OF THE EMBODIMENT

The invention described herein is a fishhook designed to eliminate the need to thread a fishing line (22) through the eyelet hole (15) by an interference fit as shown FIG. 4 and to create an interference fit between a fishing line knot (23) and the eyelet (16) to hold the fishing line knot (23) tight outside the eyelet (16) as shown FIG. 5A.

Figure 2:
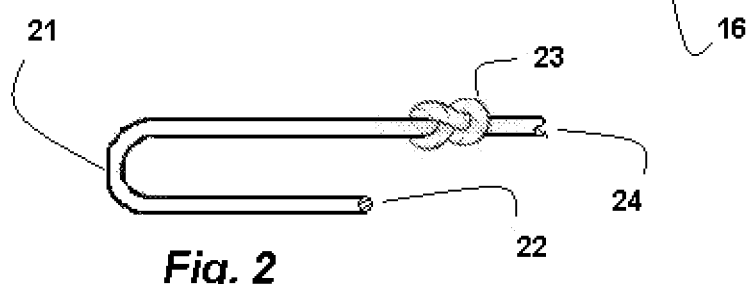
FIG. 2 is a perspective side view of a fishing line knot and fishing line.

Each fishing hook is designed to a specific size of a fishing line (22) as shown in FIG. 2.

Figure 1:
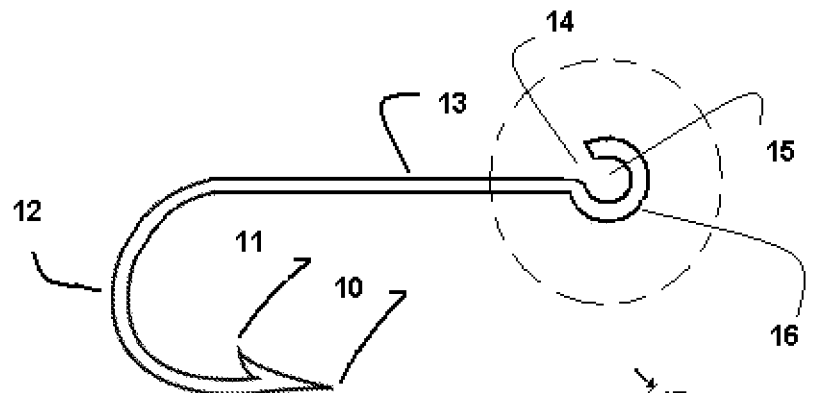
FIG. 1 is a perspective side view of an embodiment of the disclosure.

The fishhook is constructed of a round, heat treaded and harden metal rod with a point (10), barb (11), bend (12), shank (13), eyelet channel (14), eyelet hole (15) and an eyelet (16) as shown in FIG. 1.

Figure 3:
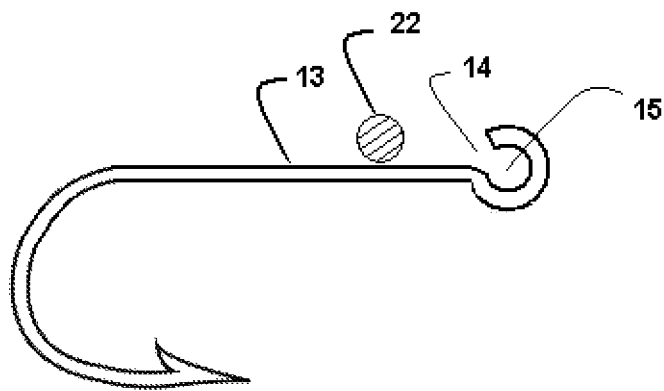
FIG. 3 is a perspective side view of the cross section of the fishing line and the embodiment of the disclosure.

The fishing line (24) extends from the fishing rod to a fishing line knot (23) through a fishing line loop (21) to the fishing line (22) as shown in FIG. 2. The fishing line (22) is tightly placed upon the shank (13) show in FIG. 3. Holding the fishhook in one hand and the looped fishing line (21) in the other hand, the looped fishing line (21) is drawn along the shank (13) towards outer opening (19) to the eyelet channel (14) as show in FIG. 3. The width of the outer opening (19) to the eyelet channel (14) is designed to be greater than the diameter of the fishing line (22), allowing the fishing line (22) to easily enter the eyelet channel (14) as show in FIG. 1A.

Figure 1A:
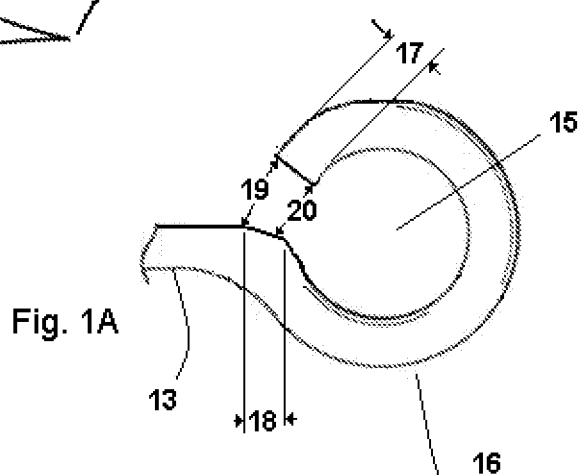
FIG. 1A is a perspective enlarged side view of an embodiment of the disclosure of FIG. 1.

The eyelet channel (14) is designed with two flat surfaces (17) and (18) opposite each other as show in FIG. 1A. The width of the flat surface of eyelet (17) inside the eyelet channel (14) as an extension of the eyelet (16) is equal to the diameter of the shank (13) as show in FIG. 1A. The width of the flat surface of the shank inside the eyelet channel (18) is equal to the diameter of the shank (13) as shown in FIG. 1A.

The two flat surfaces (25) and (26) opposite each other, allow the fishing line (22) to be compressed evenly over the entire diameter of the fishing line (22) while being drawn through the opening exit (20) into the eyelet hole (15) without damaging the strength and/or elasticity properties of the fishing line (15) as shown in FIG. 4BB.

The fishing line (22) is drawn into the eyelet channel (14) through the outer opening to the eyelet (19). The eyelet channel (14) narrows from the outer opening (19) to the inner opening (20) to the eyelet hole (15) as shown in FIG. 1A. The width of the inner opening (20) that exits to the eyelet hole (15) has a width smaller than the diameter of the fishing line (22) shown in FIG. 1A. The width of the opening to the eyelet hole (20) is designed to compress the fishing line (22) to a point of maximum compression short of fracturing the strength and/or elasticity properties of the fishing line (22) as shown in FIG. 4, but retains the strength and/or elasticity of the fishing line (22) to assume the fishing line's (22) original diameter after compression as shown in FIG. 5.

The looped fishing line (21) is compressed as the fishing line (22) is drawn through the eyelet channel (14) as show in FIG. 4. The diameter of eyelet hole (15) is the same diameter of the fishing line (22) as shown in FIG. 5. Once the fishing line (22) completely enters the eyelet hole (15), the fishing line (22) decompresses to the fishing line (22) original diameter as shown in FIG. 5. After the fishing line decompresses, an interference fit is created between the decompressed fishing line (22) and the width of the of the inner opening exiting the eyelet channel (20), holding the fishing line (22) tight within the eyelet hole (15) as show in FIG. 5.

The fishing line knot (23) is tied prior the fishing line (22) entering the eyelet (16) as shown FIG. 5A. After the decompressed fishing line (22) has entirely entered the eyelet hole (15), the fishing line (22) is drawn through the eyelet hole (15) until the fishing line knot (23) is tight against the eyelet (16) as shown in FIG. 5A. The eyelet hole (15) being smaller than the fishing line knot (23), creates an interference fit between the eyelet (16) and the fishing line knot (23), not allowing the fishing line knot (23) to pass through the eyelet hole (15) as shown in FIG. 5A. There is a tight fit between fishing line (22) and the eyelet hole (15), thus the fishing knot (23) is tightly held in the position against to the eyelet (16) as shown 5A.

SEQUENCE LISTING

Not Applicable.

The invention claimed is:

1. A fishing hook comprising a hook shank with a hook gape and point at one end and an open eyelet at an opposing end;
- an eyelet channel adjacent said open eyelet for installing a fishing line into the eyelet without threading a fishing line end therethrough; said eyelet channel is defined a flat end surface of the eyelet turn and an opposing flat surface of the hook shank configured to apply compression evenly over the diameter of a fishing line while being drawn through the eyelet channel and into an opening of said eyelet;
- wherein said eyelet channel is sized for use with a fishing line such that compression of the line occurs without permanently damaging elastic properties and strength of the line;
- said eyelet is configured for an interference fit with said fishing line diameter after travelling through said channel and into the eyelet opening.

\* \* \* \* \*